US012756071B2

(12) United States Patent
Yoon et al.

(10) Patent No.: US 12,756,071 B2
(45) Date of Patent: Oct. 6, 2026

(54) BATTERY MODULE

(71) Applicant: LG Energy Solution, Ltd., Seoul (KR)

(72) Inventors: Doohan Yoon, Daejeon (KR); Changkeun Son, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 1113 days.

(21) Appl. No.: 17/598,667

(22) PCT Filed: Apr. 8, 2020

(86) PCT No.: PCT/KR2020/004728
§ 371 (c)(1),
(2) Date: Sep. 27, 2021

(87) PCT Pub. No.: WO2020/209589
PCT Pub. Date: Oct. 15, 2020

(65) Prior Publication Data

US 2022/0190444 A1 Jun. 16, 2022

(30) Foreign Application Priority Data

Apr. 12, 2019 (KR) ........................ 10-2019-0043334

(51) Int. Cl.
*H01M 50/502* (2021.01)
*H01M 50/262* (2021.01)
(Continued)

(52) U.S. Cl.
CPC ....... *H01M 50/502* (2021.01); *H01M 50/262* (2021.01); *H01M 50/271* (2021.01);
(Continued)

(58) Field of Classification Search
CPC ............. H01M 50/502; H01M 50/262; H01M 50/271; H01M 50/50; H01M 50/211; H01M 50/248
See application file for complete search history.

(56) References Cited

U.S. PATENT DOCUMENTS

2011/0050059 A1 3/2011 Kim et al.
2011/0050060 A1 3/2011 Kim et al.
(Continued)

FOREIGN PATENT DOCUMENTS

CN 102246332 A 11/2011
CN 104769741 A * 7/2015 .......... H01M 10/625
(Continued)

OTHER PUBLICATIONS

Extended European Search Report including Written Opinion for Application No. 20786744.1 dated Apr. 12, 2022, pp. 1-7.
(Continued)

*Primary Examiner* — Uyen M Tran
(74) *Attorney, Agent, or Firm* — Lerner David LLP

(57) ABSTRACT

A battery module includes: a cell assembly including at least one battery cell; a cover plate covering a first surface of the cell assembly; and a bus bar frame covering a second surface adjacent to the first surface of the cell assembly and connected to the cover plate so as to be rotatable. The cover plate and the bus bar frame are connected by at least one connecting part including a fixing part and a pair of accommodating parts. The fixing part protrudes from a corner of the bus bar frame and is formed of a bar shape parallel to the corner. The pair of accommodating parts protrudes from the cover plate and includes a groove part into which two opposing end parts of the fixing part are inserted. The fixing part includes an inclined surface so that the width of the fixing part decreases toward both opposing end parts.

8 Claims, 8 Drawing Sheets

(51) Int. Cl.

| | |
|---|---|
| ***H01M 50/271*** | (2021.01) |
| *H01M 50/211* | (2021.01) |
| *H01M 50/284* | (2021.01) |
| *H01M 50/50* | (2021.01) |

(52) U.S. Cl.

CPC ........ *H01M 50/211* (2021.01); *H01M 50/284* (2021.01); *H01M 50/50* (2021.01); *H01M 2220/20* (2013.01)

(56) References Cited

U.S. PATENT DOCUMENTS

| | | | |
|---|---|---|---|
| 2011/0062837 | A1 | 3/2011 | Kim et al. |
| 2011/0089793 | A1 | 4/2011 | Kim et al. |
| 2011/0121694 | A1 | 5/2011 | Kim et al. |
| 2011/0189521 | A1 | 8/2011 | Lee et al. |
| 2014/0227577 | A1 | 8/2014 | Lee et al. |
| 2018/0090920 | A1 | 3/2018 | Shoji et al. |
| 2019/0348720 | A1 | 11/2019 | Oh et al. |
| 2019/0389318 | A1 | 12/2019 | Lee et al. |
| 2020/0014005 | A1 | 1/2020 | Lee et al. |

FOREIGN PATENT DOCUMENTS

| | | | | |
|---|---|---|---|---|
| CN | 107871838 | A | | 4/2018 |
| JP | 2012199102 | A | | 10/2012 |
| JP | 2016143554 | A | * | 8/2016 |
| KR | 960029126 | U | | 9/1996 |
| KR | 200123102 | Y1 | | 10/1998 |
| KR | 100937897 | B1 | | 1/2010 |
| KR | 20110013140 | A | | 2/2011 |
| KR | 20110003784 | U | | 4/2011 |
| KR | 20180078777 | A | | 7/2018 |
| KR | 20180078778 | A | | 7/2018 |
| KR | 20180099438 | A | | 9/2018 |
| KR | 20180101957 | A | | 9/2018 |
| KR | 20190031004 | A | * | 3/2019 |
| WO | 2018124751 | A1 | | 7/2018 |

OTHER PUBLICATIONS

Search Report dated Aug. 23, 2023 from Office Action for Chinese Application No. 202080028006.3 issued Aug. 26, 2023. 3 pgs. (see p. 2-3, categorizing the cited references).

Internaional Search Report for Application No. PCT/KR2020/004728 mailed Jul. 31, 2020, pp. 1-4.

* cited by examiner

BATTERY MODULE

CROSS-REFERENCE TO RELATED APPLICATIONS

This application is a national phase entry under 35 U.S.C. § 371 of International Application No. PCT/KR2020/004728 filed on Apr. 8, 2020, which claims priority from Korean Patent Application No. 10-2019-0043334 filed on Apr. 12, 2019, the entire contents of which are incorporated herein by reference.

BACKGROUND OF THE INVENTION

(a) Field of the Invention

The present invention relates to a battery module and a manufacturing method thereof, and more specifically, to a battery module and a manufacturing method thereof with improved ease of assembly.

(b) Description of the Related Art

Rechargeable batteries having high application characteristics and electrical characteristics such as high energy density according to their products are widely applied to battery vehicles, hybrid vehicles, and electric power storage devices driven by electric driving sources as well as portable devices. These rechargeable batteries are attracting attention as new energy sources for improving environmental friendliness and energy efficiency in that they do not generate any by-products of energy use, as well as their primary merit in which they can drastically reduce the use of fossil fuels.

A battery pack applied to an electric vehicle has a structure in which a plurality of cell assemblies including a plurality of unit cells are connected in series to obtain high power. Also, the unit cell may be repeatedly charged and discharged by an electrochemical reaction between constituent elements by including positive electrode and negative electrode current collectors, separators, active materials, and electrolyte solutions.

On the other hand, as the need for a large capacity structure has increased in recent years, as well as utilization as an energy storage source, the demand for a battery pack of a multi-module structure collecting a plurality of battery modules in which a plurality of rechargeable batteries are connected in series and/or in parallel is increasing.

When a plurality of battery cells are connected in series/in parallel to configure the battery pack, a common method involves a battery module being first composed of at least one battery cell and other constituent elements being added using this at least one battery module to construct the battery pack. The number of battery modules included in the battery pack or the number of battery cells included in the battery module may be variously set according to a required output voltage or a charge and discharge capacity. The battery module predetermined in this way is configured to include a plurality of battery cells that are stacked together and a bus bar frame equipped with a bus bar electrically connecting electrode leads of a plurality of battery cells.

At this time, the bus bar frame has a configuration that is assembled with a cover plate covering the upper surface of the battery cells. However, in a conventional configuration having a hinge structure formed by connecting a U-shaped hook type and a bar-shaped structure, the assembled part of the bus bar frame and cover plate may be separated during the process or during movement of the module, and in this case, a problem such as tearing of a flexible printed circuit board formed over the bus bar frame and the cover plate may occur and thus a need for a structure capable of preventing such problems is emerging.

SUMMARY OF THE INVENTION

The problem to be solved by the present invention is to provide a battery module that is capable of preventing a device from being damaged due to the separation of the bus bar frame and the cover plate, as well as ease of assembly of the bus bar frame and the cover plate.

However, the objective of the present invention is not limited to the aforementioned ones, and may be extended in various ways within the spirit and scope of the present invention.

A battery module according to an embodiment of the present invention includes: a cell assembly including at least one battery cell; a cover plate covering one surface of the cell assembly; and a bus bar frame covering the other surface adjacent to the one surface of the cell assembly and connected with the cover plate so as to be rotatable, wherein the cover plate and the bus bar frame are connected by at least one connecting part, the connecting part including a fixing part protruding from one corner of the bus bar frame and formed of a bar shape parallel to the corner, and a pair of accommodating parts protruding from the cover plate and including a groove part into which both end parts of the fixing part are respectively inserted, and the fixing part includes an inclined surface so that the width of the fixing part decreases toward both end parts.

The inclined surface may be formed to face the groove part.

A pair of accommodating parts may include an accommodating inclined surface formed on at least a part of the inner surface of the pair of accommodating parts so that the interval between the pair of accommodating parts increases in a direction toward the upper surface of the cover plate.

There may be an interval between the fixing part and the bus bar frame so that the fixing part includes a hooking surface formed on the opposite side of the inclined surface.

When the fixing part and the accommodating parts are connected, the inclined surface may be inserted into the groove part along the accommodating inclined surface until the hooking surface is in contact with the groove part.

When the fixing part is inserted, the interval between the pair of accommodating parts may be widened by the insertion of the inclined surface and then the interval between the pair of accommodating parts may be recovered to an interval of before the insertion by the contact of the fixing part with the hooking surface.

The bus bar frame may further include a separation-preventing wall facing the exterior side of the accommodating parts opposite to the groove part in the state in which the fixing part and the accommodating parts are connected.

The connecting part may further include a hooking protrusion protruding from the external circumferential surface of the pair of accommodating parts, the bus bar frame may further include a hooking sill formed on the corner, and rotation of the bus bar frame may be limited by the contact between the hooking protrusion and the hooking sill.

The fixing part may be integrally formed with the bus bar frame, and the pair of accommodating parts are integrally formed with the cover plate.

A battery pack according to an embodiment of the present invention includes: at least one battery module of any one above-described; and a pack case packing the at least one battery module.

A device according to an embodiment of the present invention includes at least one battery pack as above-described.

According to an embodiment, since the bus bar frame and the cover plate are separated, it is possible to prevent the flexible printed circuit board from being damaged, and the bus bar frame and the cover plate may be easily assembled.

DETAILED DESCRIPTION OF THE EMBODIMENTS

The present invention will be described more fully hereinafter with reference to the accompanying drawings, in which embodiments of the present invention are shown. As those skilled in the art would realize, the described embodiments may be modified in various different ways, without departing from the spirit or scope of the present invention.

In addition, unless explicitly described to the contrary, the word "comprise", and variations such as "comprises" or "comprising", will be understood to imply the inclusion of stated elements but not the exclusion of any other elements.

Further, in the specification, the phrase "in a plan view" means when an object portion is viewed from above.

Figure 1:
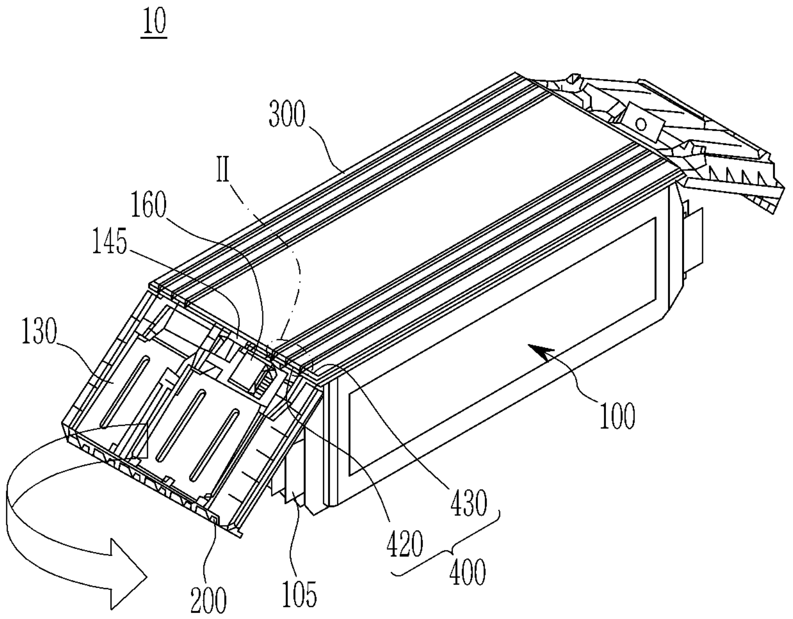
FIG. 1 is a perspective view showing a battery module according to an embodiment of the present invention.

FIG. 1 is a perspective view of a battery module according to an embodiment of the present invention.

Referring to FIG. 1, a battery module 10 includes a cell assembly 100, a cover plate 300 covering an upper surface of the cell assembly 100, and a bus bar frame 200 connected to the cover plate 300 and covering at least one side of the cell assembly 100. In addition, it may be configured such that the cell assembly 100 and the cover plate 300 are accommodated in a module case (not shown), and the bus bar frame 200 covers the opening of the module case.

The cell assembly 100 is composed of a plurality of battery cells, and for example, may be provided with a pouch-type rechargeable battery. A plurality of battery cells may be stacked and included in the cell assembly 100 and they may be electrically connected to each other. Each battery cell may include an electrode assembly, a battery case accommodating the electrode assembly, and an electrode lead 105 protruding outside the battery case and electrically connected to the electrode assembly. The electrode assembly may be composed including a positive plate, a negative plate, and a separator, and a detailed description thereof is omitted here because an electrode assembly having a known structure may be adopted.

The bus bar frame 200 is disposed to cover the cell assembly 100 and the bus bar 130 may be formed to be fixed to the bus bar frame 200. The bus bar frame 200 includes a lead slot consisting of an insulator and through which the electrode leads 105 drawn out from the cell assembly 100 may pass, and the bus bar 130 may be electrically connected to the electrode lead 105 of the cell assembly 100.

Various other electronic components may be attached to the bus bar frame 200. For example, an ICB (Internal Circuit Board) and a BMS (Battery Management System) and the like may be provided, and electronic components such as the ICB and a BMS board may be electrically connected to a plurality of battery cells.

The cover plate 300 is positioned on the upper part of the cell assembly 100, and the bus bar frame 200 may be rotatably connected to both surfaces thereof. At this time, the bus bar 130 may be mounted on the bus bar frame 200, and a flexible printed circuit board (FPCB) 145 may be disposed on the top along the length direction of the cover plate 300.

Since the flexible printed circuit board 145 is electrically connected to the bus bar 130, sensing of an overvoltage and overcurrent of the battery cell is possible, and a connector 160 is connected to one end, thereby transmitting and accommodating signals related to voltage sensing and temperature sensing to a controller provided outside the battery module 10.

Figure 2:
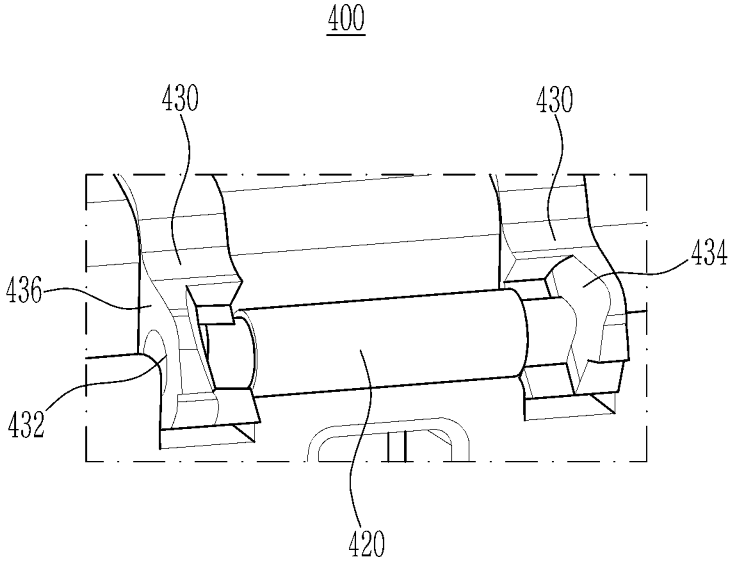
FIG. 2 is an enlarged perspective view of part II of FIG. 1.
Figure 3:
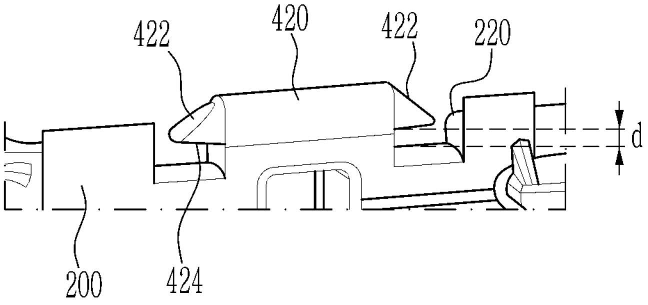
FIG. 3 is a perspective view showing a separated fixing part of a battery module according to an embodiment of the present invention.
Figure 4:
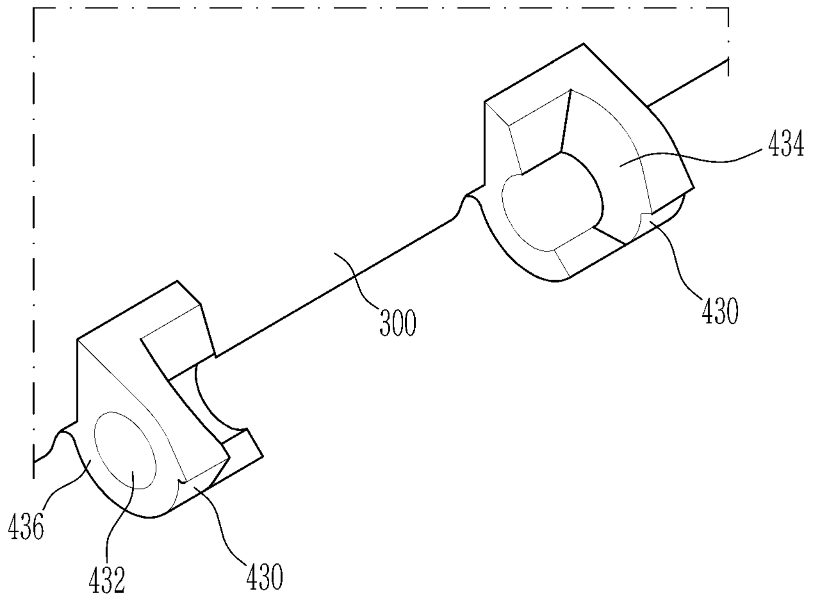
FIG. 4 is a perspective view showing a separated accommodating part of a battery module according to an embodiment of the present invention.

FIG. 2 is an enlarged view of portion II of FIG. 1, FIG. 3 is a view showing a separated fixing part 420 of a battery module according to an embodiment of the present invention, and FIG. 4 is a view showing a separated accommodating part 430 of a battery module according to an embodiment of the present invention.

Referring to FIG. 1 to FIG. 4, the cover plate 300 and the bus bar frame 200 may be connected by at least one connecting part 400 as shown in the portion II.

In detail, the connecting part 400 includes a fixing part 420 protruding from one corner of the bus bar frame 200 and formed in a bar shape parallel to one corner of the bus bar frame 200. Also, the connecting part 400 includes a pair of accommodating parts 430 protruding from the cover plate 300 and including a groove part 432. That is, as both end parts of the fixing part 420 are respectively inserted into groove parts 432 of the accommodating part 430, a connecting part 400 is formed where the bus bar frame 200 and the cover plate 300 are connected.

The fixing part 420 protrudes from one corner of the bus bar frame 200 to form the bar shape parallel to the one corner, and both end parts of the bar shape include an inclined surface 422 so that the width of the fixing part 420 decreases towards each end. The inclined surface 422 is formed to face the groove part 432 of the accommodating part 430. Also, as shown in FIG. 3, on the opposite side of the inclined surface 422, a hooking surface 424 facing the bus bar frame 200 is formed. In other words, an interval d exists between the bus bar frame 200 and the portion where the inclined surface 422 of the fixing part 420 is formed, and thus when a part of the accommodating part 430 is positioned in the corresponding interval in the assembly of the cover plate 300 and the bus bar frame 200 described later, the hooking surface 424 is connected so as to be in contact with the groove part 432 of the accommodating part 430.

Since the fixing part 420 is formed to integrally protrude from the bus bar frame 200, the central portion between the portions where both inclined surfaces 422 are positioned is connected to the bus bar frame 200 and the portion where the inclined surface 422 is separated from bus bar frame 200 by the interval d as described above. In addition, the bus bar frame 200 includes a separation preventing wall 220 facing the inclined surfaces 422 on both sides, and as a result, it is possible to prevent the connection between the bus bar frame 200 and the cover plate 300 from being separated once more, and the specific configuration is described later in the description of the assembly process and the assembled state.

The accommodating part 430 protrudes in a direction parallel to one surface of the cover plate 300 and is provided as a pair to be connected to both end parts of the fixing part 420. Each of a pair of accommodating parts 430 has a groove part 432 into which both end parts of the fixing part 420 are respectively inserted. That is, the groove parts 432 are respectively formed on the surfaces where a pair of protruded accommodating parts 430 face each other. The groove part 432, as shown in FIG. 4, may have a hole shape, but if it has a depth at which both end parts of the fixing part 420 may be stably inserted, it may be a groove shape other than a hole shape and is not particularly limited.

The inner surface of the accommodating part 430 on which the groove part 432 is formed includes an accommodating inclined surface 434. That is, the accommodating inclined surface 434 may be formed on at least a portion of an inner surface of a pair of accommodating parts 430 so that the interval between the pair of accommodating parts 430 increases in the direction toward the upper surface of the cover plate 300. As a result, as described later, the fixing part 420 may be easily inserted and the fixing part 420 may be prevented from being separated after the insertion. Also, the accommodating part 430 includes an exterior side 436 on the side opposite to the surface where the groove part 432 is formed, as described later, and the exterior side 436 faces the separation preventing wall 220 of the bus bar frame 200 in the connected state of the cover plate 300 and the bus bar frame 200.

Next, the assembly process and the assembly state of the battery module according to an embodiment of the present invention is described with reference to FIG. 5A, FIG. 5B, and FIG. 6 along with FIG. 1 to FIG. 4.

Figure 5A:
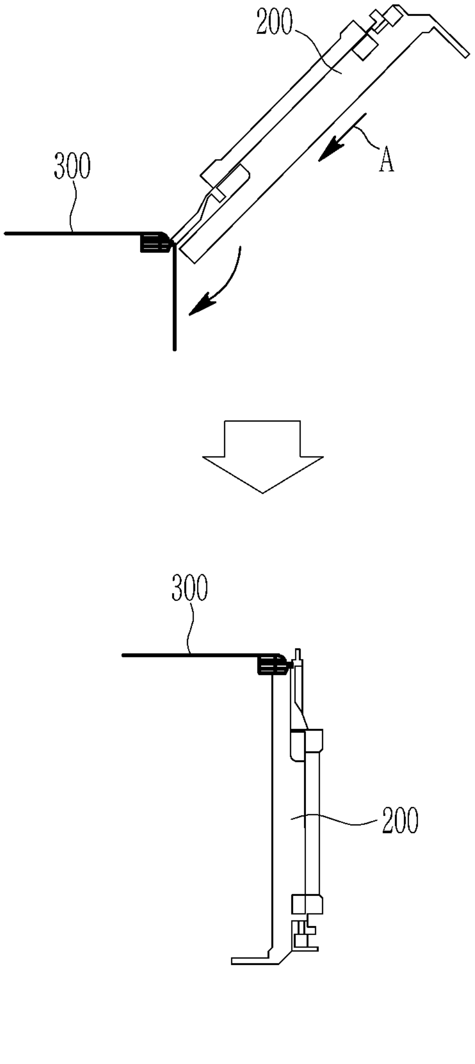
FIG. 5A is a side elevation view and FIG. 5B is a cross-sectional view showing an assembly process of a battery module according to an embodiment of the present invention.
Figure 5B:
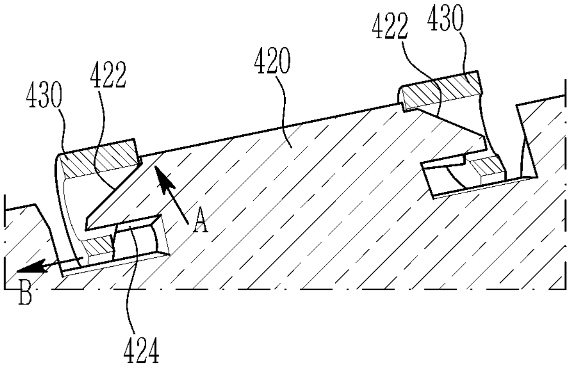
Figure 6:
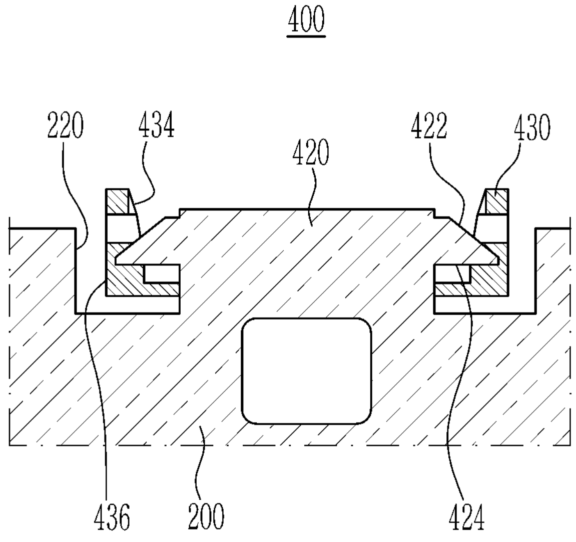
FIG. 6 is a cross-sectional view simplifying an assembly state of a battery module according to an embodiment of the present invention.

FIG. 5A and FIG. 5B are views showing an assembly process of a battery module according to an embodiment of the present invention, and FIG. 6 is a view simplifying an assembly state of a battery module according to an embodiment of the present invention.

As shown in FIG. 5A, the bus bar frame 200 is connected to the cover plate 300 at an angle while positioned above the final connected state. In this case, the bus bar frame 200 may be assembled in a state that achieves the angle of about 105 degrees compared to the final connected state. In this state, for the fixing part 420 and the accommodating part 430, as shown in FIG. 5B, the inclined surface 422 of the fixing part 420 is inserted to the groove part 432 along the accommodating inclined surface 434 of the accommodating part 430. That is, it is inserted along an arrow A of FIG. 5A.

In this process, since the inclined surface 422 of the fixing part 420 is configured to be widened in the width thereof along the insertion direction, the end of the fixing part 420 may be seated in the groove part 432 while the pair of accommodating parts 430 are slightly spread along the arrow B. In other words, because the accommodating part 430, which integrally protrudes from the cover plate 300 formed by an injection molding method, is also formed by an injection molding method, the accommodating parts 430 spread apart slightly as the inclined surfaces 422 of the end parts of the fixing part 420 are inserted along the inclined surfaces 434 of the accommodating parts 430 until they reach the groove parts 432, and the insertion is completed by contacting the hooking surface 424 of the fixing part 420 with the groove part 432. When the insertion is completed, the gap between the pair of accommodating parts 430 is restored to the original gap before the insertion. After the insertion is completed, the fixing part 420 may be rotated around the axis to obtain the final connected state in which the bus bar frame 200 and the cover plate 300 form a 90 degree angle.

Accordingly, in the state that the cover plate 300 and the bus bar frame 200 are assembled, as shown in FIG. 6, the separation of the fixing part 420 may be doubly prevented. That is, when the fixing part 420 is inserted into the groove part 432, since the fixing part 420 is inserted along the inclined surface 422 and the accommodating inclined surface 434 at the angle at which the bus bar frame 200 is disposed upward compared with the final connected state, the gap between the accommodating parts 430 may be spread naturally during the insertion. However, since the accommodating inclined surface 434 is not formed after the insertion, the separation is possible only when the gap between the accommodating parts 430 is much wider than that during the insertion, so that it is impossible to be substantially separated. In addition, even if the gap between the accommodating parts 430 is wider than this, as shown in FIG. 6, the separation of the fixing part 420 may be prevented once more because the interval between the accommodating parts 430 is prevented beyond a certain range by the separation preventing wall 220 facing the exterior side 436 of the accommodating part 430.

Therefore, according to this embodiment of the present invention, the fixing part 420 and the accommodating part 430 may be prevented from being separated at the connecting part 400 where the cover plate 300 and the bus bar frame 200 are coupled, so it is also possible to prevent damage to the flexible printed circuit board 145 or a difficulty in handling due to separation of the bus bar frame 200 and the cover plate 300.

Figure 7:
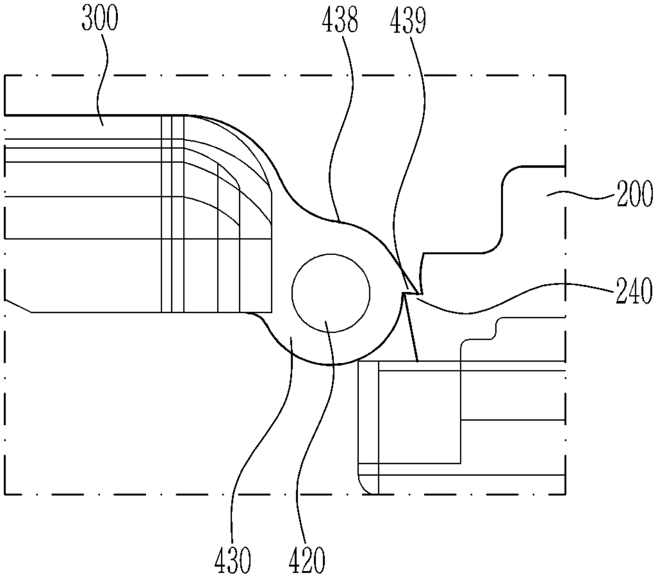
FIG. 7 is an enlarged side view of a connecting part in an assembly state of a battery module according to another embodiment of the present invention.

FIG. 7 is a view showing a state viewed from a side of a connecting part in an assembly state of a battery module according to another embodiment of the present invention.

As shown in FIG. 7, in another embodiment of the present invention, the external circumferential surface 438 of a pair of accommodating parts 430 further includes a hooking protrusion 439 protruding from the external circumferential surface 438, and the bus bar frame 200 further includes a hooking sill 240 formed on one corner. The hooking protrusion 439 and the hooking sill 240 are configured to contact each other in a state shown in FIG. 5A in which the assembly is completed, that is, in which the cover plate 300 and the bus bar frame 200 form the angle of about 90 degrees.

Accordingly, as shown in the drawing describing the assembly process in FIG. 5A, after the bus bar frame 200 is connected to the cover plate 300 at the angle where it is disposed upward, in the rotating process, if the bus bar frame 200 and the cover plate 300 form the angle of about 90 degrees, since the rotation is limited, the stability of the assembly may be maintained. Moreover, when assembling the cover plate 300 and the bus bar frame 200, even if a worker's skill level is low, the rotation stops at the correct position, thereby enabling precise assembly. Particularly, when the bus bar frame 200 is rotated by an angle of more than a right angle, it may interfere with the inner cell assembly 100 and then damage to the cell assembly 100 may be caused. However, according to the present embodiment, the bus bar frame 200 is prevented from rotating more than a right angle by the combination of the hooking protrusion 439 formed in the accommodating part 430 and the hooking sill 240 formed in the bus bar frame 200, thereby damage to the cell assembly 100 may be prevented.

Meanwhile, one or more battery modules according to an embodiment of the present invention may be packaged in a pack case to form a battery pack.

The battery module described above and the battery pack including the same may be applied to various devices. Such a device may be a transportation means such as an electric bicycle, an electric vehicle, a hybrid vehicle, etc., but the present invention is not limited to this, and the battery module may be applied to various devices capable of using the battery module and the battery pack including the same, which also belongs to the scope of the present invention.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

| <Description of symbols> | |
|---|---|
| 10: battery module | 100: cell assembly |
| 105: electrode lead | 130: bus bar |
| 200: bus bar frame | 300: cover plate |
| 400: combining part | 420: fixing part |
| 430: accommodating part | |

What is claimed is:

1. A battery module comprising:

a cell assembly including at least one battery cell;

a cover plate covering a first surface of the cell assembly; and a bus bar frame covering a second surface adjacent to the first surface of the cell assembly, the bus bar frame being connected to the cover plate so as to be rotatable with respect to the cover plate, wherein the cover plate and the bus bar frame are connected by at least one connecting part, the connecting part including a fixing part protruding from a corner of the bus bar frame, the fixing part defining a bar shape extending along an axis parallel to the corner and having two opposing ends, the fixing part including an inclined surface so that a width of the fixing part defined orthogonal to the axis decreases gradually towards both opposing ends, and a pair of accommodating parts protruding from the cover plate and including a groove part into which the two opposing ends of the fixing part are received, the pair of accommodating parts include an accommodating inclined surface formed on at least a part of an inner surface of the pair of accommodating parts so that a gap defined between the pair of accommodating parts increases gradually in a direction toward an upper surface of the cover plate, wherein a space is defined between the fixing part and the bus bar frame so that the fixing part includes a hooking surface formed opposite to the inclined surface across the width of the fixing part and when the fixing part and the accommodating parts are connected, the inclined surface is inserted into the groove part along the accommodating inclined surface until the hooking surface comes in contact with the groove part, wherein the fixing part includes an intermediate portion having a pair of edges spaced apart along a length of the fixing part, and wherein the pair of edges are spaced apart to be matched with edges of the pair of accommodating parts at a narrowest part of the gap defined between the pair of accommodating parts.

2. The battery module of claim 1, wherein the inclined surface faces the groove part.

3. The battery module of claim 1, wherein when the fixing part is connected to the accommodating parts, the gap defined between the pair of accommodating parts is widened by insertion of the inclined surface before recovering to a width of the gap before the insertion.

4. The battery module of claim 1, wherein the bus bar frame further includes a separation-preventing wall facing an exterior side of the accommodating parts opposite to the groove part.

5. The battery module of claim 1, wherein the connecting part further includes a hooking protrusion protruding from the external circumferential surface of the pair of accommodating parts, the bus bar frame further includes a hooking sill formed on the corner, and rotation of the bus bar frame with respect to the cover plate is limited by contact between the hooking protrusion and the hooking sill.

6. The battery module of claim 1, wherein the fixing part is integrally formed with the bus bar frame, and the pair of accommodating parts are integrally formed with the cover plate.

7. A battery pack comprising:

at least one battery module of claim 1; and a pack case configured to receive the at least one battery module.

8. A device comprising at least one battery pack of claim 7.

* * * * *